United States Patent Office 3,654,361
Patented Apr. 4, 1972

3,654,361
TRIS(DIFLUORAMINO) ACETAMIDE
Douglas H. Dybvig, St. Paul, and Robert J. Koshar, Lincoln Township, Washington County, Minn., assignors to Minnesota Mining and Manufacturing Company, St. Paul, Minn.
No Drawing. Filed Aug. 30, 1965, Ser. No. 484,788
Int. Cl. C07c 103/18
U.S. Cl. 260—561 A                 2 Claims This invention relates to fluorinated oxidants and more particularly to tris(difluoramino)acetamide and the process for its preparation.

Compounds containing a plurality of $NF_2$ groups are high energy oxidants which are useful components of propellant mixtures such as those used for rocket propulsion. A limitation of many of these energetic compounds, particularly those of low molecular weight, is that they are gases, or liquids which have high vapor pressure under ordinary conditions, and in many cases are extremely volatile substances.

Objects of this invention are to provide a highly energetic solid oxidant compound of relatively low molecular weight and a process for its preparation.

In accordance with the above and other objects of the invention, it has been found that tris(difluoramino)acetamide, $(F_2N)_3C—CONH_2$, can be produced by the direct fluorination of the adduct of ammonia with perfluorocyanoformamidine to form tris(difluoramino)acetonitrile, followed by hydrolysis of the latter with sulfuric acid. The tris(difluoramino)acetamide thus prepared melts at about 103 to 104° C., and when mixed with organic material in stoichiometric proportions and ignited, as by means of a squib, produces large volumes of hot gases, thus providing thermal energy as well as kinetic energy when confined in a suitable container fitted with a nozzle for this purpose.

The hydrolysis process can be carried out at temperatures ranging from about zero to 150° C. Longer reaction periods ranging up to several days are required at the lower temperatures. Ordinarily the reaction is conducted in a sealed glass vessel equipped to withstand the pressure involved. Preferably temperatures ranging from 25 to 100° C. are used.

The following example in which all parts are by weight will more specifically illustrate the novel compound and the process. Tris(difluoramino)acetamide and intermediates in the process for preparing it are potent oxidizers which can be exploded as by impact and thus should be prepared behind suitable barricades. For quantities greater than one gram, remote handling is recommended.

EXAMPLE 1

Perfluorocyanoformamidine is prepared by adding hydrogen cyanide to perfluoroguanidine (which is produced by the direct fluorination of guanidine, ammeline and the like), in an enclosed reactor using potassium cyanide as catalyst and acetonitrile as solvent, whereupon $HNF_2$ is eliminated and perfluorocyanoformamidine is isolated by condensation under vacuum in a cold trap. The compound can be purified by gas chromatography using a 10 ft. long, ½ inch diameter column composed of 33 percent by weight of perfluorotributylamine on diatomaceous earth, obtainable under the trademark name "Celite," at 0° C. The relative retention time, $T_R$, is 69 using fluorotrichloromethane as a standard.

A gaseous mixture of two millimoles of ammonia and 8 millimoles of dimethyl ether is gradually added under reduced pressure to a stirred solution of 2 millimoles of perfluorocyanoformamidine in about 1.5 ml. of liquid dimethyl ether at −110° C. contained in a borosilicate glass reactor vessel. The mixture is stirred at −110° C. for about 1 hour, and the volatile components are then removed at −63° C. under vacuum until the vapor pressure above the residue is less than about 2 mm. Hg. The residue is the adduct of ammonia and perfluorocyanoformamidine, aminodifluoraminofluoraminoacetonitrile, which is usually combined with some dimethyl ether. This residue (which is unstable at room temperature) is dissolved in about 2.5 ml. of cold, dry acetonitrile and allowed to warm to −35° C. At that temperature, fluorine in concentration of 3 volume percent in nitrogen is passed through the solution at a constant rate. A total of 28.5 millimoles of fluorine is passed through the solution in 6 hours. The volatile product, a mixture of fluorinated compounds, is collected in borosilicate glass traps which are cooled with liquid oxygen. The hydrogen fluoride which is formed in the reaction can be removed from the effluent by the use of a tube containing sodium fluoride pellets, maintained at 25° C., which is located between the reactor and the collection traps. The production of tris(difluoramino)acetonitrile can be monitored by chromatographic analysis of the effluent gas stream. The product is allowed to warm gradually to room temperature and is then passed under high vacuum through a trap cooled to −78° C., followed by a trap cooled with liquid nitrogen. The tris(difluoramino)acetonitrile is contained mainly in the nitrogen-cooled trap, and is isolated by chromatographic separation, using an 18 ft. long, ½ inch diameter column composed of 33 percent by weight of the poly(chlorotrifluoroethylene) oil (available under the trademark name "KF 8126") on diatomaceous earth (available under the trademark name "Chromasorb P") at 25° C. The relative retention time, $T_R$, is 118, using fluorotrichloromethane as a standard.

The tris(difluoramino)acetonitrile thus obtained is a colorless liquid with vapor pressure about 404 mm. Hg at 23° C. which boils at about 32° C.

A stirred mixture of 15 parts of concentrated sulfuric acid (95–98 percent) and 1 part of tris(difluoramino)acetonitrile is heated under autogenous pressure at 80–90° C. for 14 hours in a borosilicate glass ampoule. Volatile components of the mixture are removed under vacuum to yield a viscous residue having vapor pressure of less than 2 mm. Hg at 25° C. To the stirred residue cooled to about 0° C. are gradually added 20 parts of water. The resulting mixture is extracted several times with diethyl ether. The combined ether extracts are evaporated in vacuo, yielding tris(difluoramino)acetamide melting at about 103–104° C. When dissolved in a mixture of ethanol, tetrahydrofuran and fluorotrichloromethane, a fluorine n.m.r. peak is found at about −30.2$\phi$. The compound can be purified by sublimation, or by chromatography on silica gel, with ethyl acetate as the eluent.

The infrared spectrum of tris(difluoramino)acetamide exhibits prominent absorptions at 5.84 microns attributed to C=O, and at 10.52; 10.72; 11.09 and 11.41 microns attributed to NF of the NF$_2$ groups, as well as absorptions in the regions for NH of the NH$_2$ portion.

*Analysis.*—Calculated for C$_2$H$_2$ON$_4$F$_6$ (percent): N, 26.4; F, 53.8. Found (percent): N, 26.1; F, 53.1.

What is claimed is:
1. Tris(difluoramino)acetamide.
2. The process for the production of tris(difluoramino)acetamide which comprises treating tris(difluoramine)acetonitrile with concentrated sulfuric acid.

References Cited

UNITED STATES PATENTS 3,214,465  10/1965  Sausen _____ 260—543

LELAND A. SEBASTIAN, Primary Examiner

U.S. Cl. X.R.

149—109